United States Patent [19]

Buschur

[11] Patent Number: 5,168,834
[45] Date of Patent: Dec. 8, 1992

[54] LITTER HANDLING SYSTEM

[76] Inventor: Jeffrey J. Buschur, 4068 Shadowleaf Dr., Bellbrook, Ohio 45305

[21] Appl. No.: 783,239

[22] Filed: Oct. 28, 1991

[51] Int. Cl.⁵ .............................................. A01K 1/01
[52] U.S. Cl. .................................... 119/166; 209/251
[58] Field of Search ....................... 119/165, 166, 167; 209/251

[56] References Cited

U.S. PATENT DOCUMENTS

| | | | |
|---|---|---|---|
| 4,096,827 | 6/1978 | Cotter | 119/166 |
| 4,325,325 | 4/1982 | Larter | 119/166 |
| 4,325,822 | 4/1982 | Miller | 119/166 |
| 4,646,684 | 3/1987 | Embry | 119/167 |
| 5,012,765 | 5/1991 | Naso et al. | 119/166 |

Primary Examiner—John G. Weiss
Attorney, Agent, or Firm—Donald P. Gillette

[57] ABSTRACT

A litter handling system that includes two receptacles, each of which is capable of holding particulate litter and the juxtaposed edges of which are shaped to be releasably clamped to opposite surfaces of a separator that has elongated openings, to separate reusable particulate litter from clumps therein as the clamped assembly is rolled over to transfer the particulate litter, which has clumps in it, from a first one of the receptacles to the other.

23 Claims, 4 Drawing Sheets

LITTER HANDLING SYSTEM

BACKGROUND OF THE INVENTION

1. Field of the Invention

This invention relates to litter handling systems to facilitate separation of reusable litter particles from solid clumps of animal excrement while keeping the clumps and the litter particles under control so that the removal can be accomplished easily and without unduly exposing to dust from the litter either the person performing the task or the space in which the removal is carried out. The invention also relates to handling solidified clumps of urine-contaminated particles of pet litter material so that they can also be separated from uncontaminated litter particles while keeping both the contaminated and reusable portions of the litter material under control.

2. The Prior Art

A number of structures have been proposed to separate clumps of pet fecal matter from particulate litter so that the fecal matter can be disposed of, while the particulate litter, including, unfortunately, any that has been contaminated by the pet's urine, can be used over again.

U.S. Pat. No. 4,325,325 to Larter describes a three part structure, one part of which is a receptacle containing particulate litter and pet excreta. A second part is an identical, clean receptacle, and a third part is a separator having a flat, apertured screen that fits between the perimeters of both receptacles when one of them is inverted over the other. To separate the animal feces from litter particles that are to be used again, including, in Larter's device, litter contaminated by urine, the perimeters of the three parts of Larter's structure must be held firmly together by hand pressure while inverting the whole assembly to transfer the particulate litter through the screen from the receptacle that originally contained it to the clean receptacle. After it has been inverted, the latter receptacle must be released from the separator while, at the same time, holding the perimeter of the separator firmly in contact with the perimeter of the upper receptacle that still contains feces. This can be very difficult, since the device, laden with litter, can easily weigh 20 lbs., and Larter does not provide clamping means to secure the receptacles to the separator. In addition, the screen apertures are square and the edges of those apertures perpendicular to the direction of movement of the feces and granular material tumbling across the screen during the inversion of the assembly abrade the feces and cause particles of fecal material to pass through the apertures along with the litter that is not supposed to include that contaminant.

U.S. Pat. No. 4,325,822 to Miller shows a structure consisting of a pair of flanged receptacles and a flat separator with rectangular holes. A first set of flanges along the side edges of the separator forms slots into which the side edges of the receptacles must slide. A second set of flanges at the ends of the separator forms latches to connect the assembled parts together so that the assembly can be inverted to pour particulate litter from the first to the second receptacle while retaining solid fecal material in the space between the separator and the first receptacle. The sliding engagement between the side edges of the receptacles and the slots in the separator makes it extremely difficult to use liner sheets in the receptacles due to the pulling and tearing actions on the sheets. In addition, inverting the assembly causes the clumps of fecal material to undergo the same undesirable abrasion on the edges of the rectangular apertures as in the Larter structure.

U.S. Pat. Nos. 3,100,474 to Schneider and 3,908,597 to Taylor disclose a structure into which two receptacles are supported one above the other. At least the upper receptacle has a foraminated bottom through which particulate litter can filter to the lower one. The support structure is arranged to allow a flat plate to be slid between the receptacles as a temporary bottom for the upper receptacle until it is time to change the litter. At that time, the plate is withdrawn to allow particulate material, including material that has been contaminated by urine, to pass through.

U.S. Pat. No. 4,217,857 to Geddie shows three trays stacked together, all facing up. Two of them have solid bottoms, but the third one, which has an apertured bottom, is never mounted between the other two to separate fecal material from particulate litter but is simply nested in the upper tray. Enough litter is then poured into the upper tray to bury the apertured bottom of the third tray. Fecal clumps are separated from the particulate material by lifting the third tray and allowing particulate matter, including any that has been contaminated by urine, to sift through its apertured bottom. One disadvantage of the Miller structure is that the sifting disperses undesired dust in the area. In addition, the trays are not locked together to form an enclosure that can be inverted without any problem when transferring litter from one to the other to be reused.

U.S. Pat. No. 4,299,190 to Rhodes shows a double-deck litter box mounted on pivot bolts to permit it to be turned upside down to dispose of the litter. Rhodes provides no screen between the upper and lower sections, so that inverting the structure transfers all of the litter, both contaminated and not contaminated, to a garbage bag for disposal.

My copending patent application, Ser. No. 618,467, filed Nov. 27, 1990, discloses a litter material particularly suitable as a component in the system of this invention since it contains an adhesive that is activated by liquid in pet excreta, either urine or fecal matter, and, when so activated, joins particles of the litter together into clumps. This makes it possible for the structural components of the system to dispose of both urine and fecal matter with equal ease by separating the clumps, whatever their constituents, from litter material that has not been thus contaminated.

OBJECTS AND SUMMARY OF THE INVENTION

It is one of the objects of this invention to provide means for easily separating pet excreta, including clumps of fecal material and solidified clumps of urine-contaminated granulated pet litter, from relatively uncontaminated litter to allow only the relatively uncontaminated material to be used again.

Another object is to provide a system that separates granular litter from clumps without tending to break up the clumps.

A further object is to provide a simple clamping arrangement for temporarily holding together a multi-part, litter handling structure consisting of two juxtaposed receptacles, one of which is inverted, with a slotted separator between them for separating reusable granular litter material from solid fecal matter and solid clumps of litter material contaminated by urine.

A still further object is to provide means for using flexible liner sheets in litter receptacles that are clamped together in juxtaposition with a separator between them to allow the assembly to be inverted to separate clumps of pet excreta from relatively uncontaminated litter without tearing the sheets of liner material.

To those skilled in the art, further objects will become apparent from studying the following description.

In accordance with this invention, a litter handling system is provided that comprises a first receptacle to hold a quantity of litter, a second receptacle large enough to hold at least the same quantity of litter, and a separator comprising a perimeter frame, one side of which is shaped to match the perimeter of the first receptacle and the opposite side of which is shaped to match the perimeter of the second receptacle. The separator also includes a grille formed of rods with slots between them through which the relatively uncontaminated litter material can pass but not the solidified clumps of excreta, whether such clumps are litter material contaminated by urine or are solid fecal material. The rods are oriented so that, as the assembly of the juxtaposed receptacles with the separator between them is rolled over to invert it, the material within moves substantially parallel to the longitudinal direction of the rods, the direction of roll being such as to keep each of the rods in a respective plane.

The system further comprises retention means to engage the perimeter frame of the separator with either of the receptacles, selectively, and clamping means by which the frame of the separator can be secured to the perimeters of both receptacles to form a unitary structure that can be inverted from a first position, in which the first receptacle is on the bottom, the separator is in the middle, and the second receptacle is upside-down on top, to the inverted position. As the unitary structure is rolled over to the inverted position, the relatively uncontaminated litter material, which remains in relatively small particles, easily passes through the elongated openings in the grille to the second receptacle, while the solid fecal material and the solidified clumps of contaminated litter material too large to pass through the grille remain on top of the grille, securely retained within the space bounded by the separator and the first receptacle.

After the inversion, the clamping means are actuated to release the separator from the second receptacle, which is now upright and contains reusable litter that has not been contaminated by urine. This allows the separator and the first receptacle, still joined together, to be inverted back to their original position in which only the solidified clumps and the solid fecal material are returned to the space within the first receptacle. The retention means holding the separator and the first receptacle together can then be released and the separator removed to allow the solidified clumps and the solid fecal material to be discarded.

Preferably, the first and second receptacles are identical and the perimeter of each, as well as the confronting surfaces of the perimeter frame of the separator, are shaped to allow liner sheets of suitable material to be fitted into the receptacles.

I have found that it is desirable to have the rods defining the grille of the separator curved into an arc to allow the material that is to be separated to move in a sliding motion along rods in order to minimize any abrasion that would tend to break up the clumps. None of the patents cited in the preceding section has a curved grille.

BRIEF DESCRIPTION OF THE DRAWINGS

FIG. 3b is a top view of the clamp in FIG. 3a.

DETAILED DESCRIPTION OF A PREFERRED EMBODIMENT

Figure 1:
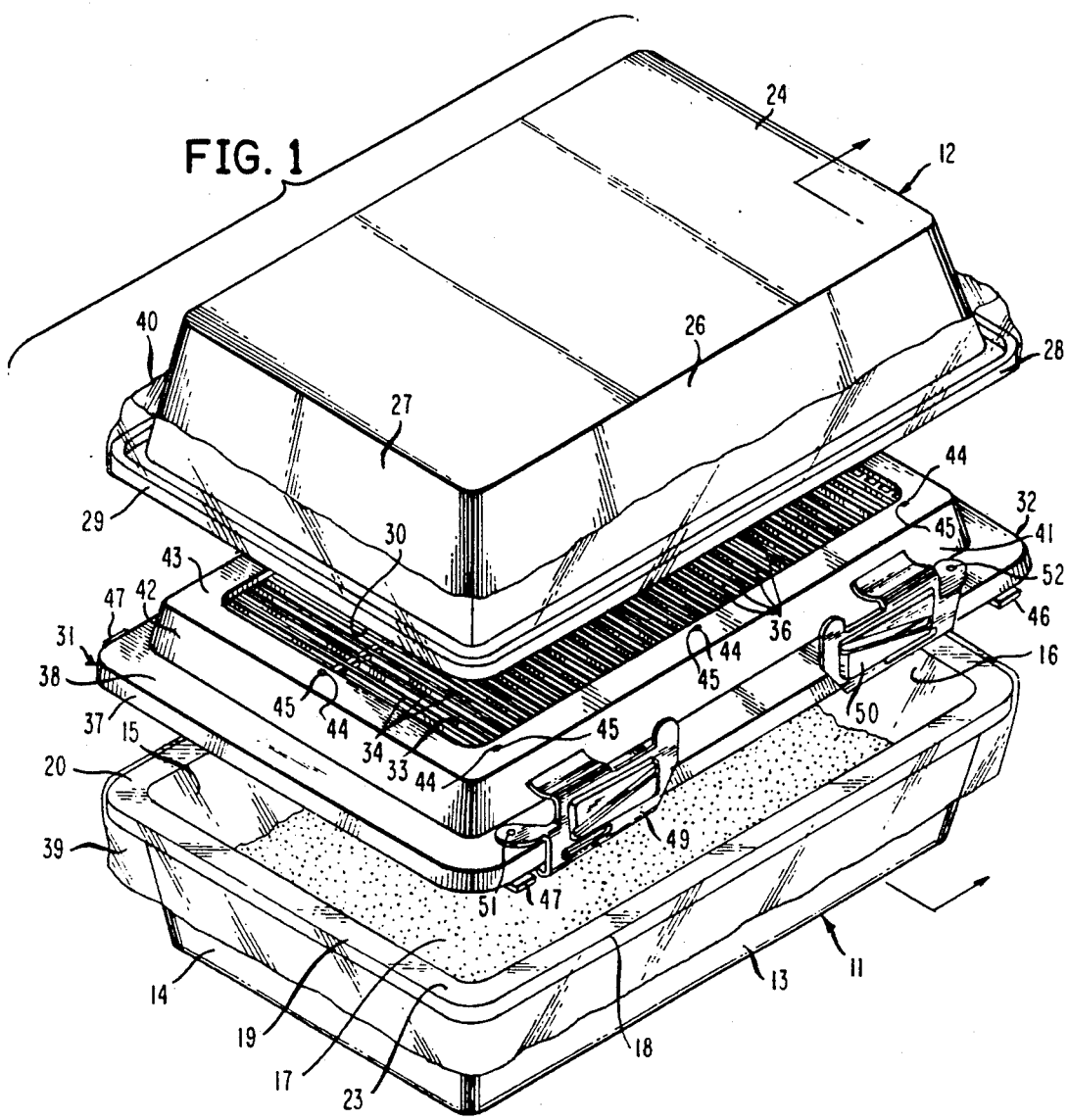
FIG. 1 is a perspective view of one embodiment of a litter system according to this invention.
Figure 2:
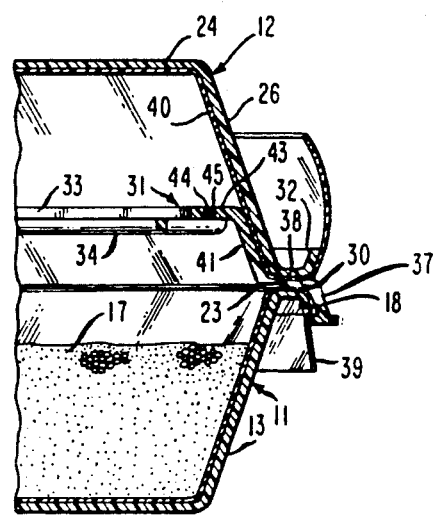
FIG. 2 is a cross-sectional view along the line A—A in FIG. 1.

The litter handling system in FIGS. 1 and 2 comprises first and second receptacles 11 and 12. In this embodiment, the receptacles are identical and are preferably molded of a suitable thermoplastic material, such as polypropylene or any other material having the strength to stand up to the type of usage to be described hereinafter. There are commercially available cat litter trays suitable for use as the receptacles 11 and 12. The receptacle 11 is in the form of a tray, or an open-topped box, capable of holding a quantity of particulate litter 17 and it has an imperforate, rectangular bottom and four sides 13–16 extending generally upwardly and slightly outwardly, from the edges of the bottom to flanges 18–21. The top surface 23 common to all of the flanges can be considered the perimeter of the receptacle 11 and is substantially flat, or coplanar, in this embodiment.

The second receptacle 12 has a rectangular bottom 24 and four sides, of which only two sides 26 and 27 are visible in FIG. 1. These sides have flanges 28 and 29 that are identical with corresponding flanges 18 and 19 on the receptacle 11. A surface 30, which faces downwardly in FIG. 1, is common to the flanges 18 and 19 and to the other two flanges not visible in FIG. 1 and can be considered to be the perimeter of the receptacle 12, corresponding to the surface 23 on the receptacle 11.

Between the lower receptacle 11 and the inverted, upper receptacle 12 is a separator 31 comprising a perimeter frame 32 having an open central area 33 and a grille 34 of molded plastic that covers the open area and comprises a large number of parallel rods 36. The perimeter frame 32 in this embodiment is based on a commercially available structure designed only as a rim to fit on the receptacles 11 or 12 to catch litter as it is flung about by the pets as they scratch it up. The frame 32 has a flange 37 with a flat portion 38 that extends outwardly over the perimeter surface 23 of the receptacle 11 and beneath the perimeter surface 30 of the receptacle 12. The downwardly facing surface of the flat portion 38 seals off the receptacle 11 when the perimeter frame is placed upon the matching flat surface 23, and the upper surface of the flat portion 38, which is shaped to match the flat, downwardly-facing perimeter surface 30, seals off the receptacle 12. A liner sheet 39 of flexible material, such as polyethylene, which is shown fitted into the receptacle 11, extends over its perimeter 23, and a similar liner sheet 40 fitted into the receptacle 12 extends over its perimeter 30. While these liner sheets are primarily provided to prevent litter and pet excreta from contacting the receptacles 11 and 12, they also help seal any gaps between the receptacles and the frame 32.

As shown in FIGS. 1 and 2, the perimeter frame of the separator 31 in this embodiment includes four low, inwardly slanting walls, of which only two walls 41 and 42 are visible in FIG. 1. These walls are just inside the sides 26 and 27 of the receptacle 12 and are substantially parallel to these sides when one of the receptacles is fitted down on top of the separator, as is the receptacle 12 in FIG. 2. Thus, the walls 41 and 42 and the corresponding opposite walls form a truncated pyramid, at the top of which is a substantially flat, inwardly projecting rim 43. This rim surrounds the open central area 33. In accordance with this invention, the rim 43 supports the outer parts of the grille 34. To do so, several holes 44 are formed in the rim 43 around the central area to receive pins 45 that are molded integrally with the rest of the grille and extend upwardly from it.

The flange 37 also has tabs 46 and 47 located near diagonally opposite corners of the perimeter frame 32 to serve as retention means to engage opposing flanges 18 and 20 of the receptacle 12 and hold that receptacle against the separator 31 when the separator is placed on the receptacle 11. In this embodiment, the edges of the flanges 18-21 on the receptacle 11 are formed so that they are more or less parallel to the respective sides 13-16 from which they extend, giving a U-shaped cross-sectional configuration to the parts of the receptacle 11 where the flanges 18-21 are located. The same is true of the receptacle 12.

Two resilient clamps 49 and 50 are pivotally mounted on pivot pins 51 and 52 near opposite ends of the flat portion 38 of the flange 37 to engage the flanges 18 and 28 when it is necessary to join the receptacles 11 and 12 to the separator 31. While the clamps are shown as being mirror images of each other, they can be identical.

Figure 3A:
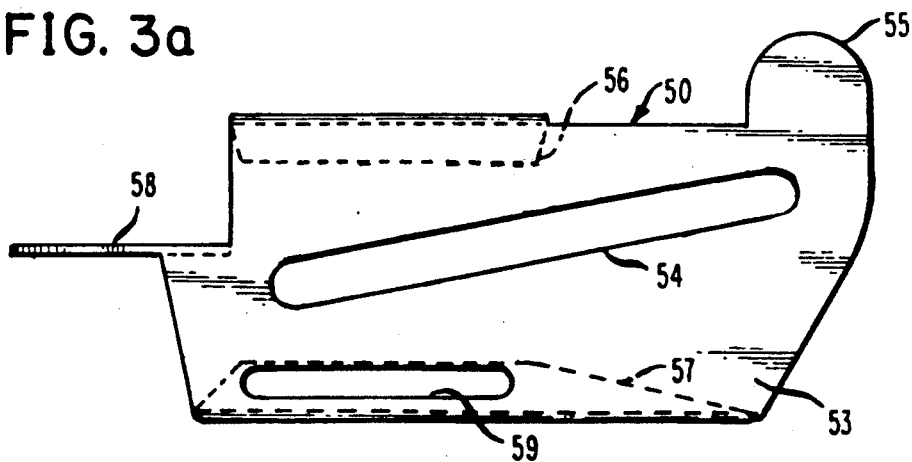
FIG. 3a is a side view of a clamp in FIG. 1.
Figure 3B:
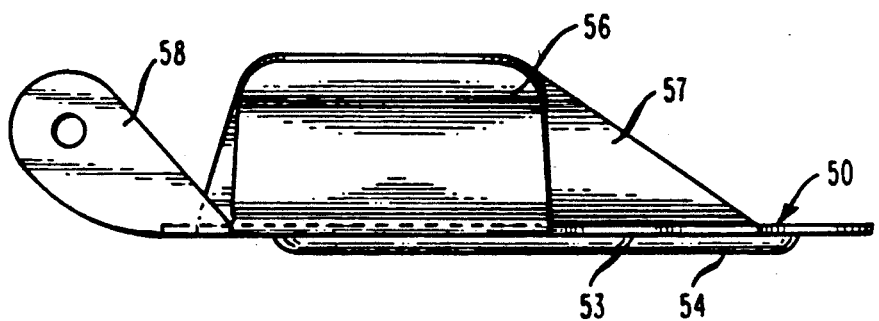
Figure 3C:
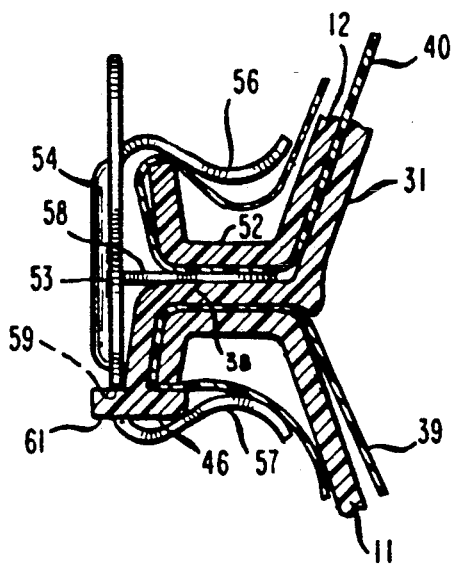
FIG. 3c is an end view of the clamp in FIGS. 3a and 3b.

The clamp 50 is shown in greater detail, in FIGS. 3a-3c. It has a central portion 53 with a stiffening gusset 54 and a finger tab 55 by which the clamp is pivoted on the pivot pin 52. The clamp 50 is made of resilient sheet metal and has two flaps 56 and 57 that are bent somewhat toward each other so that, at their region of closest approach, they are spaced apart by a distance less than the total distance between the edges of the flanges 18 and 28 when the receptacles 11 and 12 and the separator 31 are fitted together as closely as they will go. As a result, the flaps 56 and 57 exert resilient force on these edges to hold the assembly of the receptacles and the separator together when it is time to remove clumps from the litter 17. In order to make it easy to force the flaps 56 and 57 over the edges of the flanges 18 and 28, the outer edges of the flaps 56 and 57 are bent up.

A flange 58 is bent so that it extends perpendicularly to the central portion 53 and lies in a plane midway between the flaps 56 and 57. This allows the flange 58 to be pivotally mounted on the flat portion 38 and the flaps 56 and 57 to be in the proper positions to engage the edges of the flanges 18 and 20 with equal resilient force. The flange 58 has a hole through which the pivot pin 52 extends. The central portion 53 is provided with a slot 59 so as not to interfere with a projection 61, which is an outwardly extending part of the tab 46.

Figure 4A:
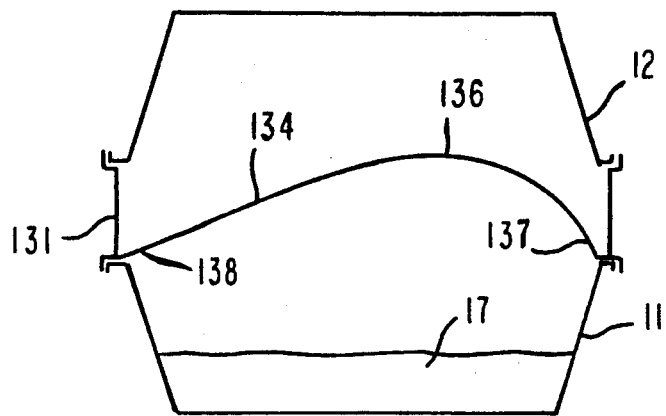
FIG. 4a is a simplified cross-sectional view of a modified form of a litter system in an initial position just prior to removal of clumps of solid material.
Figure 4B:
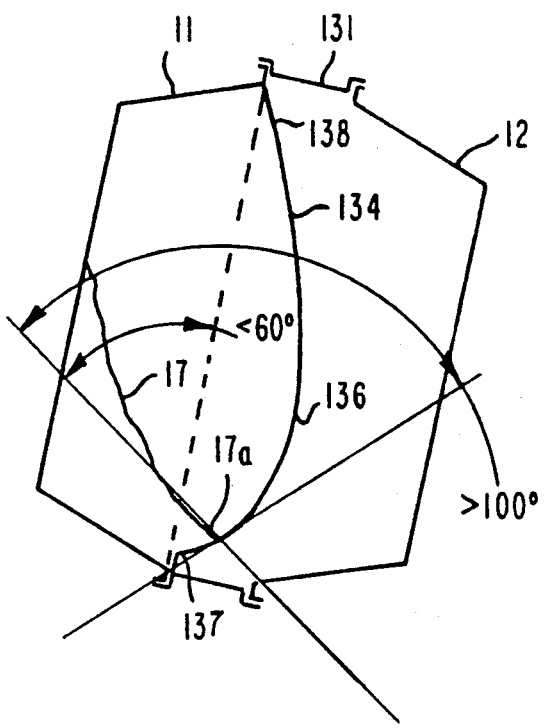
FIG. 4b shows the litter system of FIG. 4a in a later position during removal of clumps of solid material.

FIGS. 4a and 4b show two positions of a modified form of litter handling system as it is manipulated to separate clumps of solid material from litter material that is still in granular form. In particular, if the litter material contains liquid-activated, clump-forming material, such as that described in my co-pending application Ser. No. 618,467, the granular litter material will be substantially free of contamination by excreta containing sufficient fluid to activate the clump-forming material. The reason is that the litter material includes a component that exhibits adhesive characteristics when water in any form is applied to it. Any wetted particles tend to clump together and turn into hard clumps that can easily be separated from the granular material by allowing the litter material 17 to move across the separating grille 34, or, in the case of the structure in FIGS. 4a and 4b, the grille 134.

Many types of water-activated adhesives can be employed to accomplish the clumping function with litter material that takes up liquid. Suitable adhesive materials include: starches, such as wheat paste; cellulosic materials, such as methylhydroxypropylcellulose (MHPC), sodium carboxymethylcellulose (CMC), methylcellulose (MC), and Metylan Cellulose; and mixtures of the foregoing materials with each other and with gums, such as gum arabic.

The adhesive material is mixed as a dry powder with the powdered, or particulate, to produce a coating of the adhesive material on all of the particles of litter material. This makes sure that any particle of litter that comes into contact with liquid from the pet will have adhesive material on that particle to be activated by the liquid and to bond that particle of litter with any other particle with which the activated adhesive comes into contact. Thus, substantially all of the wetted, adhesive-coated litter particles will bind together in a clump of sufficient size and structural integrity to be easily separated by mechanical means from the unaffected particulate material that has not been wet.

In the case of cellulosic materials, I have found that the ratio of the weight of the adhesive material to the total weight of litter plus adhesive material should be about 0.05% to about 25%. Of the starches, I have found that wheat paste, when used in the ratio of at least about 2% to about 25%, by weight, relative to the mixture of adhesive and litter, is quite satisfactory. Preferably, the weight ratio of wheat paste to the total mixture should be about 8% to about 14%.

The structure in FIGS. 4a and 4b show the same receptacles 11 and 12 as are shown in FIG. 1 with certain modifications to the separator identified by reference numeral 131 in FIGS. 4a and 4b. This separator has a wall that is relatively cylindrically shaped, although the cross section of the cylinder is relatively rectangular, rather than round, since it corresponds to the shape of the perimeters 13 and 30 of the receptacles. By being somewhat cylindrical, the separator 131 spaces the receptacles 11 and 12 far enough apart to use a grille 134 that is not flat but rounded. Specifically, the rods 136 making up the grille are curved so that the grille 134 is in the shape of a sector of a cylindrical shell, the radius of curvature of which is smaller at one side 137 of the shell than at the opposite side 138. The angle at which the side 137 intersects the plane of the rim 43 (shown in FIG. 1) is between about 60° and 90°, which is substantially less than the angle at which the opposite side 138 intersects that plane.

FIG. 4a shows the litter handling system in the normal position and ready to have any clumps removed. The separator 131 and the inverted receptacle 12 have been clamped in place by clamps similar to the clamps 49 and 50 so that the whole structure moves as a closed unit from which granular material cannot escape.

FIG. 4b shows the structure partly rolled over to an inverted position. It will be noted that the litter material 17 has started to shift and that its leading edge 17a has started to move across the grille 134, longitudinally along the rods 136. The rolling of the structure is in the direction that causes the litter material to encounter the side 137 first. Since the radius of curvature of that side is smaller than the radius of curvature of the opposite side, the angle between the surface of the litter material 17 at the edge 17a and the ends of the curved rods forming the grille 134 is greater than 90°, typically about 100° or more. As a result, the litter material tends to flow across the surface of the grille rather than to fall upon it, as it would tend to do if the angle were more acute. This results in less harsh forces acting on the clumps, thus resulting in a lesser tendency to break them up.

Figure 5:
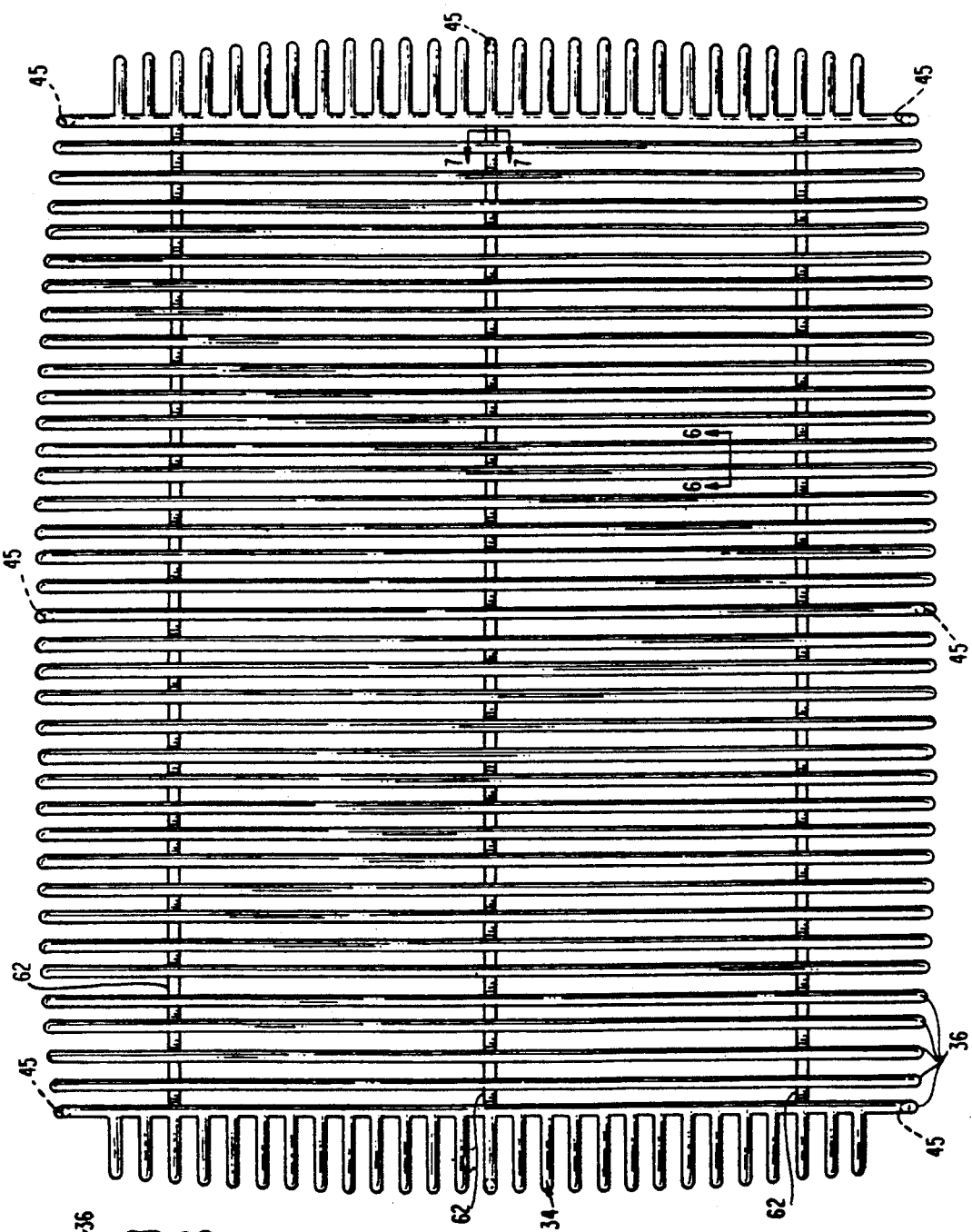
FIGS. 5 shows one embodiment of a grille used in the system in FIG. 1.
Figure 6:
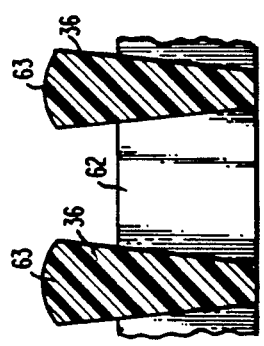
FIG. 6 shows a cross section of the grille in FIG. 5 along the line 6—6.

While there is the advantage just discussed in providing a grille that is curved, flat grilles can also be used. FIG. 5 shows the grille 34 as a flat grille made up of rods 36 connected together by cross bars 62. FIG. 6 shows a preferred cross-sectional shape of the rods 36 in which their surface 63 is cylindrically rounded, and the thickest part of the bars is adjacent the surface 63. That surface is the one that faces the receptacle holding the litter material 17 that contains clumps, and making that surface somewhat rounded protects the clumps from encountering sharp edges as the litter material flows across the surface of the grille 34 (or 134 in FIGS. 4a and 4b), thus exerting less fracturing force on the clumps than if the rods 36 (or 136) had sharp corners. While it is preferable to make the surface 63 rounded, it is not mandatory; the fracturing force is manageable even if the surface 63 is flat, or even somewhat concave.

Figure 7:
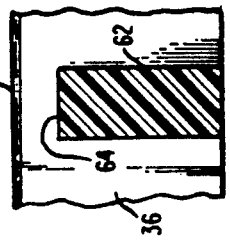
FIG. 7 shows a cross section of the grille in FIG. 5 along the line 7—7.

The reason for making the rods 36 thicker near the surface 63 than near the opposite surface is that any granular material capable of passing through the narrowest part of the passageway between adjacent rods will continue on through and not get stuck in the middle. FIG. 7 shows a fragment of the grille 34. As may be seen, the surface 64 of the cross bar 62 facing in the same direction as the surface 63 is below the level of the surface 63, thus assuring that no clumps will strike the sharp edges of the cross bars 62.

When the system is in use, the receptacle 11 will be open so that the pet will have access to the litter material 17. When the owner decides that it is time to separate the clumped material from the remainder of the litter material, the separator 31 or 131 is placed on the perimeter 23 of the receptacle and the receptacle 12 is locked into place on it. Then the closed structure is rotated in the direction to cause the litter material to flow longitudinally along the rods 36 or 136, and this rotation continues until the structure is completely inverted, with the receptacle 12 on the bottom and the receptacle 11 on top. By the time this position is reached, substantially all of the granular litter material will have passed through the grille to the receptacle 12, and all of the clumps will be resting on the grille 34 (or 134). The clamps 49 and 50 can then be released, allowing the separator and the receptacle 11 to be removed.

The receptacle, now resting upright, will thus be exposed as having a substantial quantity of the granular litter material in it. It may be desirable to add some litter material to that in the receptacle 12 at this time, but the relatively small amount to be added is only to take the place of litter material that has been formed into clumps that still remain in the space bounded by the receptacle and the separator 31 (or 131), and is much less than would have to be added if there were no adhesive material.

The advantage of the tabs 46 and 47 show up at this time. They hold the separator on the receptacle 11 even after the clamps 49 and 50 have been released, thereby preventing the separator from falling away from that receptacle. This allows the receptacle to be turned back to the upright position before the separator is deliberately released by manipulation of the somewhat flexible separator and receptacle. The clumps lying in the liner sheet 39 in the receptacle 11 can then be removed by gathering up the liner sheet and disposing of it and its contents without having to dispose of a large quantity of litter material still in the granular condition.

What is claimed is:

1. A litter handling system to separate reusable particulate litter from clumps mixed with the particulate litter, said system comprising:
   (a) first and second receptacles to hold particulate litter, each of the receptacles having a perimeter region; and
   (b) a separator comprising:
      (i) frame means comprising first and second opposing edge regions with an open central area between the edge regions, and
      (ii) a grille extending over the open central area and having first and second surfaces facing in opposite directions, said grille comprising elongated means defining elongated openings therebetween large enough to allow particulate material to pass therethrough but small enough to prevent the clumps from passing through, the frame being shaped to fit each of the receptacles.

2. The litter handling system of claim 1 in which the elongated mean comprises a plurality of substantially parallel rods, and the elongated openings are slots between adjacent rods, the slots being wide enough to allow the particulate litter to pass therethrough but narrow enough to prevent the clumps from passing therethrough.

3. The litter handling system of claim 2 in which the width of each of the rods is greater adjacent the first side of the grille than it is adjacent the second side thereof.

4. The litter handling system of claim 3 in which each of the rods has a generally cylindrically rounded surface facing in the first direction.

5. The litter handling system of claim 2 in which each of the rods is in a plane.

6. The litter handling system of claim 2 in which the rods are longitudinally curved, whereby the grille has a generally concave surface facing in the first direction.

7. The litter handling system of claim 1 in which the grille defines a surface that is a sector of a cylindrical shell.

8. The litter handling system of claim 7 in which the grille comprises a plurality of substantially parallel, each of the rods being curved along its length according to the curvature of the shell.

9. The litter handling system of claim 8 in which the radius of curvature of each rod at points along its length is greater closer to the second edge region than to the first edge region.

10. The litter handling system of claim 9 in which the edge regions are substantially coplanar, and the rod ends closer to the first edge region intersect the plane at an angle of between about 60° and 90°.

11. The litter handling system of claim 1 comprising, in addition, first and second flexible liner sheets fitted into the first and second receptacles, respectively, and extending over the perimeter regions thereof to be held between the respective perimeter region and portions of the separator facing those perimeter regions.

12. A litter handling system to separate reusable particulate litter from clumps mixed with the particulate litter, said system comprising:
 (a) first and second receptacles to hold particulate litter, each of the receptacles having a perimeter region comprising flange means;
 (b) a separator comprising:
  (i) frame means comprising first and second opposing edge regions with an open central area between the edge regions, and
  (ii) a grille extending over the open central area and having first and second surfaces facing in opposite directions, said grille defining openings large enough to allow particulate material to pass therethrough but small enough to prevent the clumps from passing through, the frame being shaped to fit each of the receptacles;
 (c) retention means to hold the separator releasably on either of the receptacles separate from the other receptacle and with the first surface of the grille facing the receptacle on which the separator is releasably held; and
 (d) resilient clamping means to hold the receptacles with their respective perimeter regions confronting each other, whereby the receptacles form a temporary enclosure substantially free of any gap through which particles of litter material could escape.

13. The litter handling system of claim 12 in which the edge regions of the separator are parts of a perimeter frame.

14. The litter handling system of claim 13 in which the clamping means comprises a clamp having:
 (a) a central member pivotally mounted on the perimeter frame, the central member being attached to the first plate to be pivoted toward and away from the perimeter frame; and
 (b) first and second resilient flaps juxtaposed with respect to each other and comprising edge portions extending from the central member generally in the direction toward the first and second receptacles, respectively, when the central member is pivoted toward the perimeter frame, the edge portions of the flaps being spaced far enough apart to embrace the first and second flange means of both of the receptacles simultaneously and to exert pressure thereon to press both of the flange means toward the perimeter frame.

15. The litter handling system of claim 13 in which the clamping means comprises first and second clamps, each of said clamps having:
 (a) a central member;
 (b) a first plate, each of the first plates extending perpendicularly from the central member and being pivotally mounted at spaced apart locations along one side of the perimeter frame, each central member being attached to the respective first plate to be pivoted toward and away from the perimeter frame; and
 (c) first and second resilient flaps juxtaposed with respect to each other and comprising edge portions extending from the central member generally in the direction toward the first and second receptacles, respectively, when the respective central member is pivoted toward the perimeter frame, the edge portions of the flaps of each clamp being spaced far enough apart to embrace the first and second flange means to exert resilient pressure thereon to press both of the flange means toward the perimeter frame.

16. A litter handling system to separate reusable particulate litter material from clumps mixed with the particulate litter material, said system comprising:
 (a) particulate, non-toxic, liquid-activated litter material to form clumps when activated by liquid in pet excreta;
 (b) first and second receptacles to hold particulate litter material, each of the receptacles having a perimeter region;
 (c) a separator comprising:
  (i) frame means comprising first and second opposing edge regions with an open central area between the edge regions, and
  (ii) a grille extending over the open central area and having first and second surfaces facing in opposite directions, said grille defining openings large enough to allow particulate material to pass therethrough but small enough to prevent the clumps from passing through, the frame means being shaped to fit each of the receptacles;
 (d) retention means to hold the separator releasably on either of the receptacles separate from the other receptacle and with the first surface of the grille facing the receptacle on which the separator is releasably held; and
 (e) resilient clamping means to hold the receptacles with their respective perimeter regions confronting each other, whereby the receptacles form a temporary enclosure substantially free of any gap through which particles of litter material could escape.

17. The litter handling system of claim 16 in which the particulate litter material comprises liquid-activated adhesive material mixed with the particles of litter to join particles of the litter material together to form the clumps when the adhesive material is activated by liquid in pet excreta.

18. The litter handling system of claim 17 in which the adhesive material is a starch and comprises about 8% to about 14% of the weight of the litter material.

19. The litter handling system of claim 18 in which the starch is wheat paste.

20. The litter handling system of claim 17 in which the adhesive material comprises a material selected from the group consisting of methylhydroxypropylcellulose. methylcellulose, sodium carboxymethylcellulose, and Metylan Cellulose.

21. The litter handling system of claim 20 in which the adhesive material comprises a mixture of at least about 0.1%, by weight, of a cellulose adhesive.

22. The litter handling system of claim 20 in which the adhesive material comprises a mixture of at least about 2% by weight of wheat paste.

23. In a litter handling system comprising a first receptacle to hold particulate litter material to receive pet excreta therein and having a perimeter region uppermost, a second receptacle having a perimeter region, a separator comprising a frame shaped to fit the perimeter region of each of the receptacles and having an open central area and a grille extending over the open central area and defining elongate openings wide enough to allow the particulate litter material to pass therethrough but small enough to prevent clumps from passing therethrough, the method of separating reusable particulate litter material from clumps mixed with the particulate litter material, said method comprising the steps of:

(a) resiliently clamping the receptacles together with the second receptacle inverted on top and with the respective perimeter regions of the receptacles confronting each other to form a temporary enclosure substantially free of any gap through which particles of litter material could escape;

(b) rolling the temporary enclosure over to allow the particulate litter material to fall through the elongated openings to the second receptacle while retaining the clumps on the grille;

(c) releasing the second receptacle while retaining the separator on the first receptacle to retain the clumps in the space bounded by the separator and the first receptacle;

(d) reinverting the first receptacle;

(e) removing the separator from the first receptacle; and (f) disposing of the clumps in the first receptacle.

* * * * *